United States Patent
Wetterer et al.

(10) Patent No.: US 7,040,252 B2
(45) Date of Patent: May 9, 2006

(54) SNAP N LAP PET FOOD DISH HOLDER

(76) Inventors: Pamela Pierson Wetterer, 3941 Alicia Dr., San Diego, CA (US) 92107; Keith Donald Wetterer, 3941 Alicia Dr., San Diego, CA (US) 92107

( * ) Notice: Subject to any disclaimer, the term of this patent is extended or adjusted under 35 U.S.C. 154(b) by 0 days.

(21) Appl. No.: 10/858,111

(22) Filed: Jun. 1, 2004

(65) Prior Publication Data

US 2005/0045113 A1    Mar. 3, 2005

Related U.S. Application Data

(60) Provisional application No. 60/474,884, filed on Jun. 3, 2003.

(51) Int. Cl.
*A01K 5/00* (2006.01)

(52) U.S. Cl. ..................... 119/61.54; 108/26

(58) Field of Classification Search ............ 119/61.54, 119/61.5, 61.51, 61.53, 61.52, 61.56; 220/574, 220/574.1, 574.3, 23.2, 23.4, 23.8; D7/550.1, D7/552.1, 698, 699; 269/302.1, 289 R; 108/25, 108/26

See application file for complete search history.

(56) References Cited

U.S. PATENT DOCUMENTS

| | | | | |
|---|---|---|---|---|
| 2,411,864 A * | 12/1946 | Birkin | ...................... | 220/23.83 |
| 2,728,209 A * | 12/1955 | Bowes et al. | ................ | 220/737 |
| 2,813,509 A * | 11/1957 | Bruno | ...................... | 119/51.01 |
| 3,995,844 A * | 12/1976 | Hellman | .................... | 269/54.5 |
| 4,863,033 A * | 9/1989 | Buj | .............................. | 206/541 |
| 4,907,539 A * | 3/1990 | Abulhasan | ................ | 119/61.54 |
| 4,971,676 A * | 11/1990 | Doue et al. | .................. | 118/503 |
| 4,989,846 A * | 2/1991 | Quinn | ......................... | 269/54.5 |
| D315,082 S * | 3/1991 | Liberty, II | .................... | D7/601 |
| D326,211 S * | 5/1992 | Allen | .......................... | D7/698 |
| 5,221,032 A * | 6/1993 | Bott et al. | ................... | 224/270 |
| D353,077 S * | 12/1994 | Hollstrom et al. | ........ | D7/553.5 |
| 5,390,798 A * | 2/1995 | Yanuzzi | ....................... | 206/562 |
| D375,877 S * | 11/1996 | Dotson et al. | ............... | D7/698 |
| D376,767 S * | 12/1996 | Duran | ........................ | D10/106 |
| 5,580,037 A * | 12/1996 | Gore | ........................ | 269/54.5 |
| D380,944 S * | 7/1997 | Nielsen | ....................... | D7/698 |
| D383,042 S * | 9/1997 | Lach | ........................... | D7/698 |
| D409,049 S * | 5/1999 | Millard | ..................... | D7/553.1 |
| 6,216,605 B1 * | 4/2001 | Chapman | ..................... | 108/26 |
| 6,276,675 B1 * | 8/2001 | Shamoon | ................ | 269/289 R |
| 6,371,470 B1 * | 4/2002 | Ward | ...................... | 269/289 R |
| D464,237 S * | 10/2002 | Kaposi | ........................ | D7/698 |
| 2005/0039607 A1* | 2/2005 | Comfield | ..................... | 99/324 |

* cited by examiner

*Primary Examiner*—Yvonne R. Abbott

(57) ABSTRACT

A pet feeding device for holding a commercially available disposable paper plate, comprising a tray base with four molded integral hooks. The paper plate is slid in place under three of the four hooks and snapped in place under the fourth hook to secure it in place. The hooks keep the paper plate from being moved or turned over while the pet is feeding. The tray base prevents food displaced from the plate by the feeding animal from falling on the floor. After the pet has finished eating, the paper plate is easily snapped out the device and disposed of. The device eliminates the need for washing pet food dishes and provides a sanitary method of pet feeding. The tray base with its integrated, molded hooks is made of a plastic or similar material that is easily washable by hand or in a dishwasher.

3 Claims, 4 Drawing Sheets

1 Tray
2 Hooks
3 Handle
4 Paper Plate or the like

1 Tray
2 Hooks
3 Handle
4 Paper Plate or the like

1 Tray
2 Hooks
3 Paper Plate or the like

1 Tray
2 Hooks
3 Handle
4 Paper Plate or the like

1 Tray
2 Hooks
3 Handle
4 Paper Plate or the like

SNAP N LAP PET FOOD DISH HOLDER

Related U.S. Applications Data: Provisional Application No. 60/474,884 filed on Jun. 3, 2003.

REFERENCES CITED

U. S. Patent Documents

| | | | |
|---|---|---|---|
| 2,813,509 | November, 1957 | Bruno, A.C. | 119/51 |
| 3,115,251 | December, 1963 | Farrell, J. E. | 211/41.2 |
| 3,306,260 | February, 1967 | Ciampi, L. | 119/51.03 |
| Des. 209,755 | January, 1968 | Robert, T. | D30/13 |
| 3,527,192 | September, 1970 | Ferrara, T. | 119/61 |
| 3,653,362 | April, 1972 | Davis, P. | 119/61 |
| 3,698,594 | October, 1972 | Boehlert, M. A. | 270/63 |
| 3,821,061 | June, 1974 | Schier, R. W. | 161/42 |
| 3,991,719 | November, 1976 | Bruce, D. | 119/61 |
| Des. 257,494 | November, 1980 | Imhoff, K. S. | D30/16 |
| 4,257,353 | March, 1981 | Imhoff, K. S. | 119/61 |
| 4,587,930 | May, 1986 | Trego, J. L. | 119/61 |
| 4,949,678 | August, 1990 | Demko, A. J. | 119/61 |
| Des. 330,785 | November, 1992 | Jordan, D. P. | D30/129 |
| Des. 351,263 | October, 1994 | Evans, D. S. | D30/129 |
| 5,445,110 | August, 1995 | Bimie, V. L. | 119/61 |
| Des. 386,838 | November, 1997 | Pini, J. F. | D30/133 |

BACKGROUND OF THE INVENTION

1. Field of the Invention

The present invention relates to a pet feeding device for cats, dogs or similar domestic animals that is used with commercially available disposable paper plates or the like so that clean pet food plates are available to the animal for each feeding and the immediate floor area around the pet food plate is kept free of fragments of uneaten food.

2. Description of Prior Art

Various existing pet food feeding devices employing disposable liners or means to hold dishes, plates or bowls in place on a tray or platform attempt to solve the problem of easily feeding a pet and cleaning up afterwards.

For example, U.S. Pat. No. 3,991,719 to Bruce discloses a pet feeding receptacle comprising a holder having a bowl shape for holding a quantity of bowl shaped liners that are removed after each use. Although it eliminates the need to wash the feeding dish, it requires a special liner that may not be readily available in retail outlets and may be more expensive than commercially available paper plates. It does not provide a tray to prevent uneaten food from falling onto the floor.

U.S. Pat. No. 2,813,509 issued to Bruno describes an animal feeding device in which a bowl is anchored to a mat so as to prevent overturning of the bowl. Although a mat is provided to prevent uneaten food from falling to the floor, it requires washing the pet food bowl.

While the devices above use disposable liners or bowls or a mat to anchor a bowl in place, the device according to the present invention departs from the art by providing a tray base having hooks to receive and anchor in place commonly available commercial paper plates or the like. The animal feeding plate is anchored in place, while the tray base provides a surface to receive uneaten scraps of food so they do not come in contact with the floor. The paper plates can easily be unsnapped and disposed of after each feeding.

The present invention fulfills the need for a pet feeding device allowing for the convenient use of disposable feeding receptacles and a means for avoidance of spillage of uneaten food on the floor.

SUMMARY OF THE INVENTION

In view of the foregoing discussion of various types of animal feeding devices, the present invention provides a new feeding device for cats, dogs or similar domestic animals wherein standard commercial and readily available paper plates or the like are anchored to a tray base of solid construction that stays in place while the animal is feeding. The tray base surrounds the paper plate or the like so that it does not move and uneaten scraps of food do not come into contact with the floor or surface upon which the tray base rests.

To attain this, the present invention consists of a tray base, having a top and bottom surface, rectangular, square or elliptical in shape and made of plastic or similar material having hooks to hold the paper plates or the like in place. The hooks may be attached to the tray base or molded onto the tray base and integral to it. The hooks are positioned equally around the tray base to receive paper plates or the like of various sizes. The hooks hold the plate securely onto the tray base, so that when the animal is feeding, the lightweight paper plate or the like with the food placed on it does not move as the animal eats. The paper plate is slid into three of the four hooks and then snapped into place under the fourth hook to hold it securely in place. At the same time, the tray base, being of substantial construction will remain in place on the floor or surface upon which it is placed. The fact that the tray base is larger than the plate means that uneaten scraps of food displaced from the plate or dropped from the animal's mouth fall onto the tray base and not onto the floor or surface upon which the tray base rests. Once the animal has finished feeding, the paper plate or the like, with any remaining food scraps may be easily removed from the hooks by unsnapping the plate from any of the four hooks and sliding it out from under the other three hooks. The used paper plate is then disposed of, so that a clean paper plate or the like may be easily placed into the hooks, ready for the placement of food on the paper plate or the like for the next feeding.

The above information broadly outlines the major features of the invention so that the detailed accounts to follow may be better understood and its contribution to the art may be appreciated.

It is to be understood that the detailed description of one embodiment of the invention is not limited in its application to the details of construction and to the arrangements of the components set forth in the following descriptions of illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is the object of this invention to provide a pet feeding device that is convenient to use by having the advantages of providing a clean commercially available plate for food for each feeding and eliminating the need to clean and wash feeding plates prior to each feeding; and to provide a more sanitary feeding environment by eliminating dropped scraps of uneaten food from falling onto the floor or other surface upon which the tray base is placed.

Another object of this invention is that by being made of a plastic or similar material, it is easily washable by hand or in a dishwasher.

Another object of this invention is to provide a pet feeding apparatus that is durable and easily manufactured at a low cost in parts and labor so that it can be marketed to the buying public at a low price.

Yet another object of the invention is to provide a pet feeding device that provides many of the advantages of the prior art while improving on it and overcoming any disadvantages associated with the prior art.

For a better understanding of the invention, its operation and advantages of use, reference should be made to the accompanying drawings and their description illustrative of the preferred embodiments of the invention.

BRIEF DESCRIPTION OF THE DRAWINGS

The invention will be better understood and objects other than those set forth above will become apparent when consideration is given to the following description thereof. The description refers to the annexed drawings wherein.

DESCRIPTION OF THE PREFERRED EMBODIMENT

With reference now to the drawings, a new pet feeding device consisting of a tray base with hooks to hold in place a commercially available paper plate or the like for the feeding of pets and embodying the principles and concepts of the present invention will now be described.

Specifically, it will be noted that the pet feeding device enabling the use of commercially available disposable paper plates or the like comprises, in its broadest context, a number of components including a tray base, a handle, and a plurality of hooks designed to hold a paper plate or the like in place. The components are configured to obtain the desired objective.

The invention has a tray base (1) with top and bottom surfaces. The tray base is made of a plastic material or the like and is thick enough to give the tray base weight and thin enough so that it can rest on a floor or other flat surface and be low enough so the pet can eat comfortably. The tray base with its integrated hooks is made of plastic or similar material that can be washed by hand or in a dishwasher.

Figure 2:
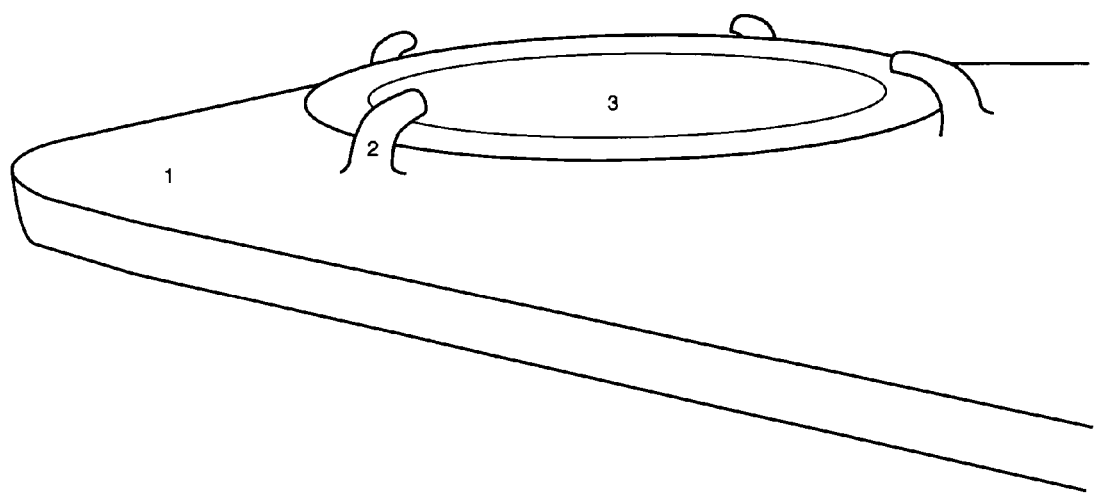
FIG. 2 is an oblique view of the top of the tray base of the invention showing the detail of how the hooks are an integral part of the tray base and rise out of the top surface of the tray base.

The next component of the device are hooks (2), in the case of the preferred embodiment, numbering four, that are spaced at ninety degree increments to hold a standard sized paper plate or the like in place. The hooks are an integral part of the tray base and rise from the upper surface of the tray base as shown in FIGS. 2 and 3.

Figure 1:
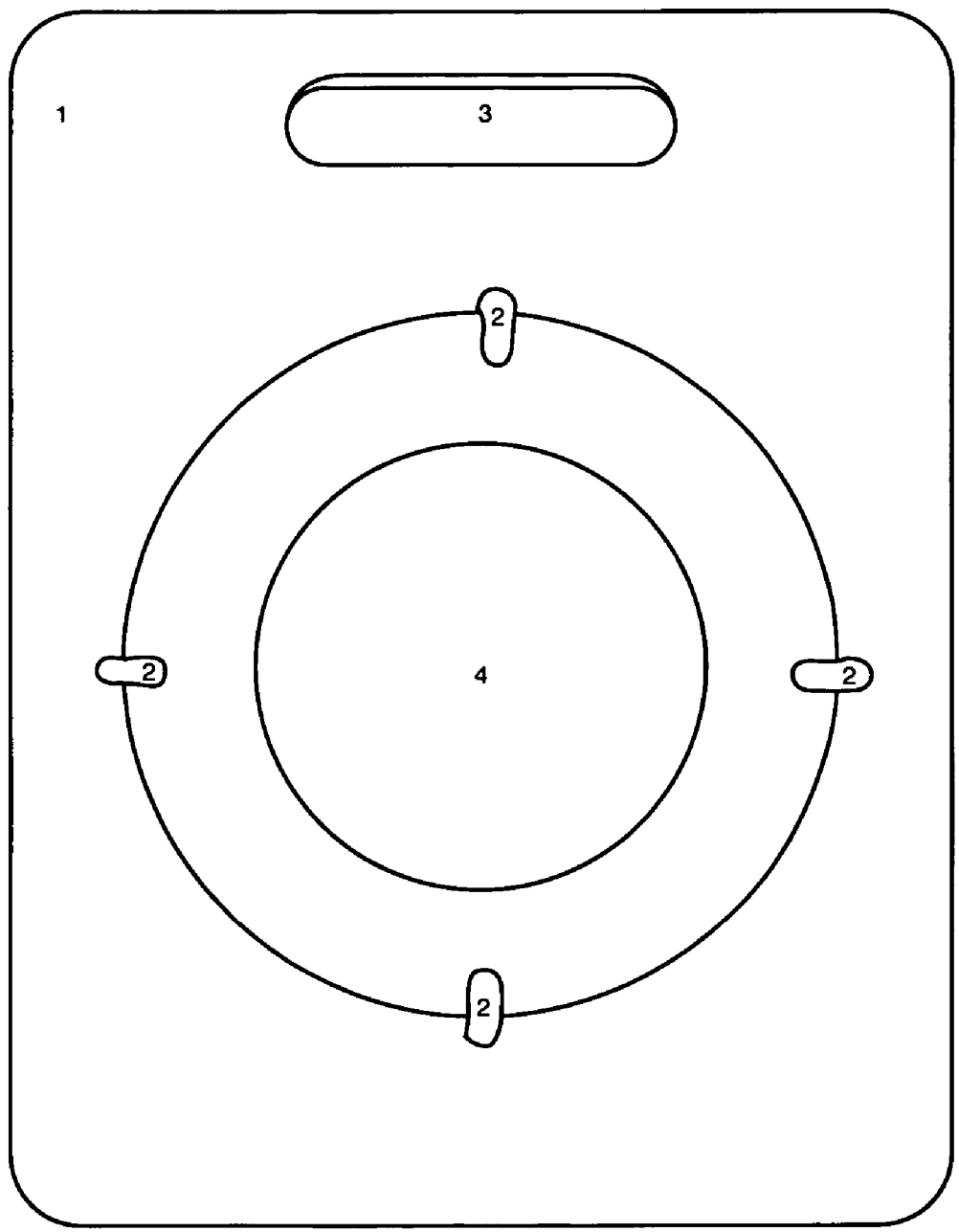
FIG. 1 is a top down view of the preferred embodiment of the invention, the Snap N Lap Pet Food Dish Holder. It shows the tray base, handle, hooks and a paper plate or the like installed.
Figure 3:
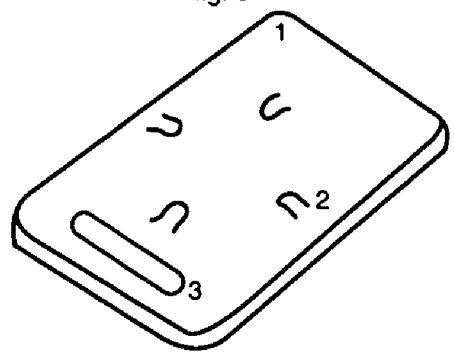
FIGS. 3, 4 and 5 show the device without a paper plate or the like in place (FIG. 3); the device with the edge of a paper plate or the like held in place by three of four hooks (FIG. 4); and finally with a paper plate or the like snapped into all four hooks and held in place.
Figure 4:
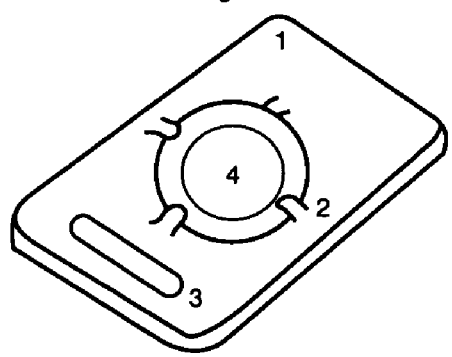
Figure 5:
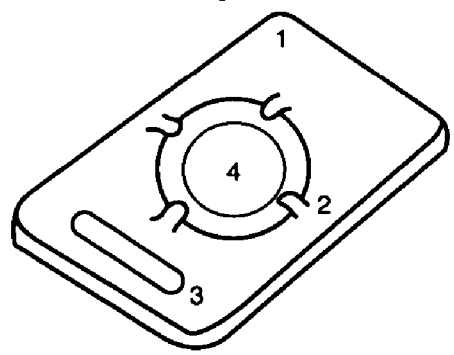
Figure 6:
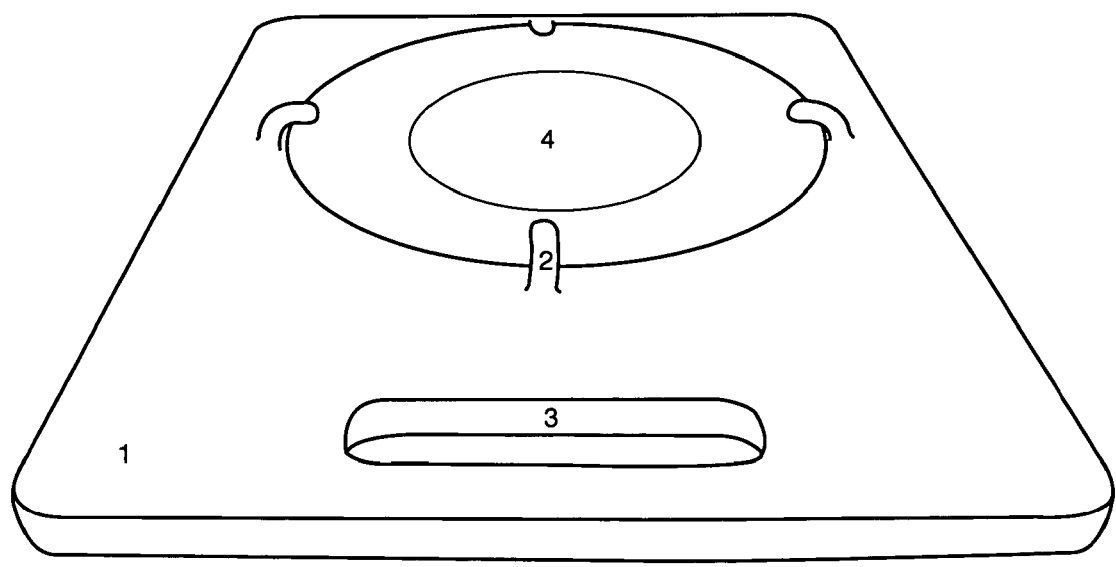
FIG. 6 is a perspective view of the invention showing, as in FIG. 1, the surface of the tray base, the handle, the hooks and a paper plate or the like installed and held in place by the hooks.

The next component is the handle (3) that is readily seen in FIGS. 1, 3 and 4. The handle may be used to carry the device or hang the device from a hook when it is not in use. The handle is cut out of the tray base as is readily apparent from the illustrations of FIGS. 1, 3 and 4.

The final component is a commercially available paper plate or the like (4) that is held in place by the hooks (2) and upon which the food for the pet is placed. The paper plate is held in place by sliding the edges of the plate (4) under any three hooks (2) and snapping it in place under the fourth hook, as can be seen in the sequence of FIGS. 3 and 4. Once the paper plate or the like (4) is held in place by the hooks (2), it is securely held in place and will not move on the surface of the tray base as the pet eats the food placed upon the plate. The paper plate or the like can be any such plate commonly available in retail stores and of a size that will fit into the hooks. It is thus apparent that the invention may be configured in several different size embodiments which can hold paper plates or the like of varying sizes. Thus the invention may be made in configurations for use by small or large animals.

The invention is so named because the paper plate or the like is snapped into the hooks as described above and held in place while the pet eats the food from the plate in a characteristic lapping motion using its tongue and teeth. While the pet is eating, any bits of uneaten food either fall back on to the plate or onto the tray base rather than the floor or flat surface the tray base rests upon. After the pet has finished eating, the paper plate or like is easily unsnapped from one of the hooks, slid out of the remaining three hooks of the tray base and disposed of.

The invention is an improvement over placing a food dish made of plastic, glass or a similar material on a floor or flat surface. Bits of uneaten food will not fall on the floor, but on the tray base, which is made of easily washable material. Since commonly available disposable paper plates or the like are used for containing the food and may be disposed of after the pet has eaten, the need to wipe out or wash the plate is eliminated. Sometimes dried food may be caked on to a plate making washing difficult. The invention is thus a convenient and sanitary means of feeding pets. The invention may make it more convenient for persons with multiple pets to feed, as each animal may have its own feeding device.

A further discussion of the use and operation of the invention is not deemed necessary as the same should be apparent from the above discussion.

With respect to the invention, the optimum dimensional relationships for parts of the invention, to include variations in size, materials, shape, form, function and manner operation, assembly and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pet food dish holder for feeding pets consisting of:

A solid tray base having top and bottom surfaces; said solid tray base made of plastic consisting of four hooks molded to the top surface of the solid tray base and arranged in a circular pattern spaced at ninety degree intervals; whereby when a disposable paper plate is placed on the upper surface of the solid tray base, it is snapped into place by sliding the disposable paper plate under three of the four said hooks and snapping the edge of the disposable paper plate under the one remaining hook of the four hooks such that the paper plate is held securely in place; and a handle cut out of one end of the solid tray base.

2. The four hooks of claim 1 molded to the top surface of the said solid tray base, spaced in a circular pattern at ninety degree intervals located at the approximate center of the solid tray base that is larger than the circular pattern of the said four hooks.

3. The solid tray base of claim 1, made of a plastic material, and of rectangular, square or elliptical shape comprising a handle that is rectangular, square, round or elliptical and cut out of one far or distal end of the said solid tray base.

* * * * *